(No Model.)
W. R. KING & F. WYATT.
ELECTRIC FURNACE.
No. 562,403. Patented June 23, 1896.
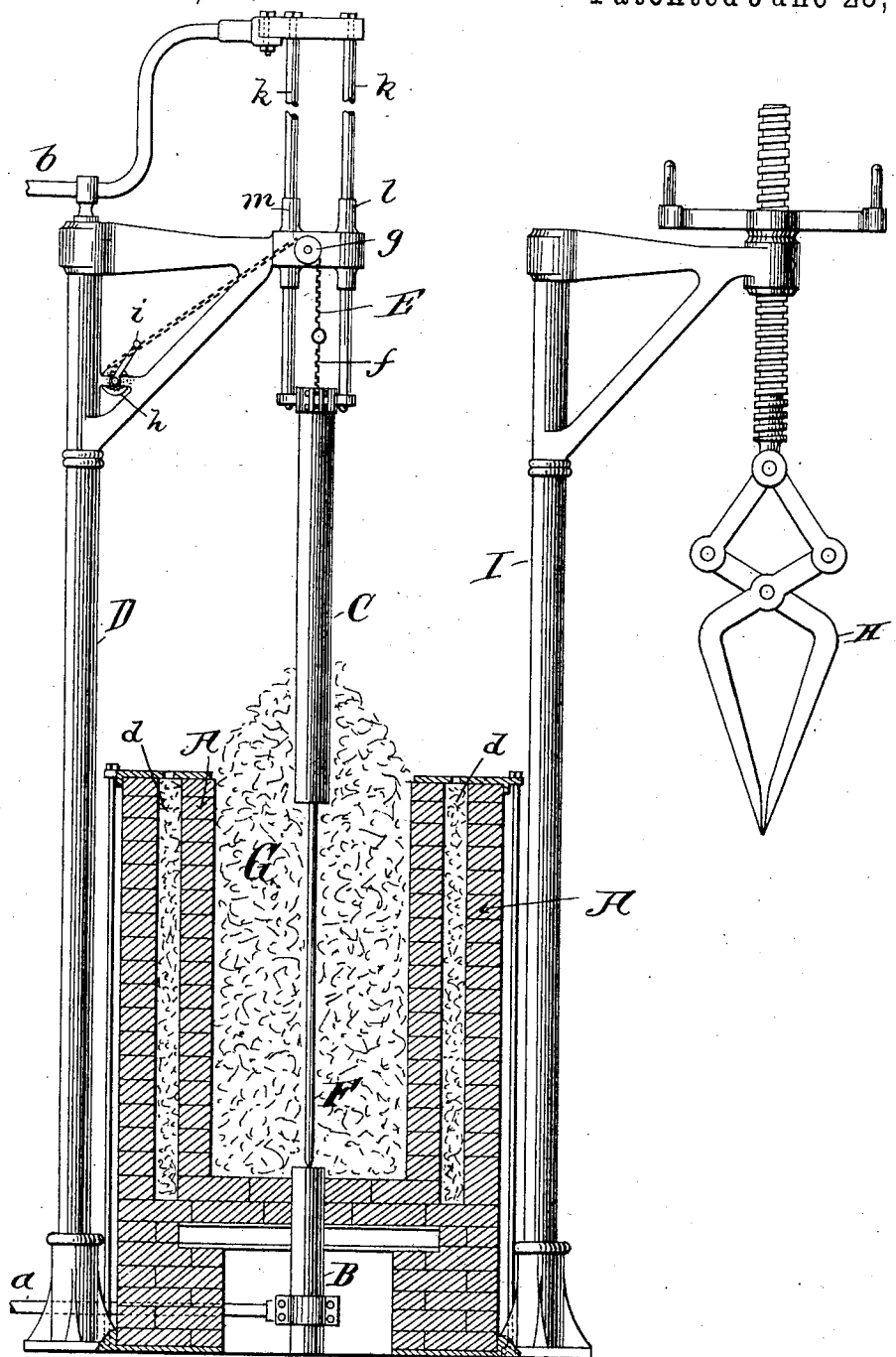
WITNESS:
C. W. Benjamin
J. Kennedy.
INVENTORS
William R. King
Francis Wyatt
BY
J. P. Preble Jr.
Their ATTORNEY

UNITED STATES PATENT OFFICE.

WILLIAM R. KING AND FRANCIS WYATT, OF NEW YORK, N. Y.

ELECTRIC FURNACE.

SPECIFICATION forming part of Letters Patent No. 562,403, dated June 23, 1896.

Application filed April 21, 1896. Serial No. 588,446. (No model.)

*To all whom it may concern:*

Be it known that we, WILLIAM R. KING, a citizen of the United States, and FRANCIS WYATT, a subject of Her Britannic Majesty, residents of the city, county, and State of New York, have invented certain new and useful Improvements in Electric Furnaces, of which the following is a specification.

The object of our invention is to provide an improved electric furnace for the manufacture of calcium carbid and for the reduction of metallic oxids generally.

Heretofore, when calcium carbid has been manufactured in an electric furnace, it has been usual to employ an electric-arc furnace. We have not found the electric arc very well adapted to this purpose; and the object of our invention is to provide a simple form of electric furnace which employs the incandescent principle in distinction from the arc principle.

Among the many disadvantages, which, aside from its expensiveness, attend the use of the electric arc for this purpose, may be mentioned two which are, perhaps, the most serious. The first is that the heat of the arc being effective elsewhere than at the center of the field, for the reason that after the formation of the carbid no further action takes place, it has been found that the calcium carbid, when formed, frequently contains an unassimilated mass of carbon or coke in its center. This indicates an absolute loss of just so much energy. The second disadvantage is that the distance between the electrodes and the resistance of the current are constantly changing to conform to the changes in character and quantity of the molten mass within the electric field.

There are many other disadvantages, such as the necessity for waiting till the charge becomes comparatively cool before removing it and putting in the new charge, the difficulty of stoking the furnace as the gases escape, which will readily occur to persons practically familiar with this art.

We have found that when we use the incandescent principle by sending the current through a conducting-core, which connects the two electrodes, and heating this core, which is preferably destructible to incandescence, we avoid all of these difficulties, either wholly or to a very large extent, and are able to produce a crystalline calcium carbid which is substantially pure.

The best form of apparatus in which we have as yet embodied our invention is illustrated in the accompanying drawing, in which—

A is an upright furnace open at the top. The walls and bottom $d\,d$ of this furnace may be made of fire-brick, common brick, or any desired durable material, with or without a non-conducting granular filling $e$, as desired, as the mixture from which we manufacture the calcium carbid is such a bad conductor of heat and electricity that the walls of the furnace are not subjected, even where the furnace is run continuously, to any undue amount of heat or electric force.

Through the bottom of the furnace and preferably in its vertical center, there projects upward the negative electrode B. This is preferably a good-sized carbon stick; but we have found that the wear upon this electrode is so slight that it is not necessary to provide any feeding or adjusting mechanism for it.

When in course of time the top of the electrode wears down to the level of the bottom of the furnace, the blow of a hammer will drive it in enough for all practical purposes. It is not necessary to the action of the furnace that this electrode should project into the furnace at all. It is, however, a matter of convenience in bringing about contact with the destructible core to have the electrode project somewhat above the bottom of the furnace, as its position has to be discovered by feeling. This electrode is of course connected by a suitable wire $a$ to the negative pole of the dynamo or other source of electric supply.

C is the positive electrode, which is adjustably mounted upon the swinging frame D, which stands at one side of the furnace and is provided with a raising and lowering device E, consisting of the chain $f$, attached to the electrode and passing over the pulley $g$ on the framework. The other end of said chain is attached to the roller $h$, provided with a suitable ratchet, as shown, the roller being free to turn in one direction to permit the electrode to move downward when otherwise unsupported. The electrode is lifted by turning the roller $h$ in the opposite direction by the crank $i$, by means of which the electrode C may be lifted or depressed, as occasion requires. This electrode is connected by the wire $b$ and conducting-rods $k\ k$, which are insulated from the framework D by the posts $l\ m$, through which they pass, to the positive pole of the dynamo and is preferably a carbon stick of the same diameter as the electrode B.

The distance between these electrodes is of slight importance and will depend upon the desired height of the furnace, as they are not intended when in action to shoot a spark across the intervening space, but are connected by the core F. This core should be of good conducting material and is preferably a small rod of carbon or coke, so that it may be destroyed and become a constituent part of the calcium carbid as it forms.

G is the material out of which the calcium carbid is to be formed. This material consists of about equal portions of pulverized coke and ground lime, and is simply shoveled into the furnace to any desired height, and the conducting-core F is then driven down through the mass until it comes in substantial contact with the electrode B. It is not necessary that the contact thus brought about should be electrically perfect, as the operation of the furnace will soon dispose of any particles of material which may be crushed or held between the lower end of the core and the upper part of the electrode. The swinging frame D is then turned so as to bring the electrode C directly over the core F, and the electrode is then lowered into contact with the core. The material G is then heaped up a little around the sides of the upper electrode, so as to prevent free access of the air to said core.

H is a pair of grasping-jaws or lifting-tongs suitably mounted upon a swinging device I, conveniently located near the furnace. Its function is to force its way downward through the mass of material after the calcium carbid has been formed, the latter being in the form of a nugget, and rising, lift this nugget clear of the furnace and carry it to a convenient distance, where it may be allowed to cool and subjected to any desired subsequent operation. As this removal of the nugget takes place without allowing the charge of the furnace to cool, and as another conducting-core can be inserted immediately, it is obvious that the interval between successive charges of the furnace is so slight that the operation may be fairly considered continuous.

Of course, very extensive modifications may be made in the various devices for bringing the upper electrode into position and removing it therefrom or for the removal of the nugget or for the insertion of the conducting-core without departing from the spirit of our invention.

The operation of our improved furnace is as follows: A mixture of lime and coke is put in the furnace to the desired height, the upper electrode being out of the way. A suitable conducting-core is forced down through the material substantially into contact with the electrode B. The upper electrode is then swung into position and lowered into contact with the conducting-core. The mixed lime and coke is heaped up around the sides of the upper electrode so as to cover its point of contact with the core. The current is then turned on and the core brought to incandescence. Either a direct or an alternating current may be used. The white heat is maintained until a nugget of calcium carbid is formed. This is readily determined by the ampere-meter and voltmeter usually employed for testing electric currents. The maintenance of a temperature sufficient to keep the mass at white heat necessitates the presence in the path of the current, as is well known, of a large amount of resistance. This is indicated by the number of volts and amperes shown by the ampere-meter and voltmeter. The fused calcium carbid offering much less resistance to the current than the mixture of coke and lime, it is obvious that when the resistance is thus shown to have fallen below that of said mixture the current is doing no work, but simply flowing along the fused calcium carbid. The upper electrode is then raised and swung out of the way. The grasping-jaws are then swung over the furnace and lowered open into the mass of coke and lime. The jaws are then closed around the nugget of calcium carbid and rising lifts it out of the mass, which then falls in and fills the hole thereby left, while the jaws are swung away carrying the calcium carbid nugget. A new core is inserted, a little more coke and lime shoveled into the furnace and a new nugget formed in the same way. This process can be continued indefinitely.

We claim—

The above-described electric furnace for producing calcium carbid which consists of two electrodes, one above the other, the upper one being removable, devices for raising, lowering and removing the upper electrode, suitable electric connections for connecting the two electrodes with currents of opposite polarity, a conducting-core connecting said electrodes with each other when in operating position, and devices, substantially as described, for raising the carbid nugget, when formed, out of said furnace, so that the latter may be used immediately for the formation of another nugget.

WILLIAM R. KING.
FRANCIS WYATT.

Witnesses:
J. KENNEDY,
W. P. PREBLE, Jr.